(No Model.)
J. C. RICHARDSON.
NUT BLANK BAR.
No. 461,932. Patented Oct. 27, 1891.
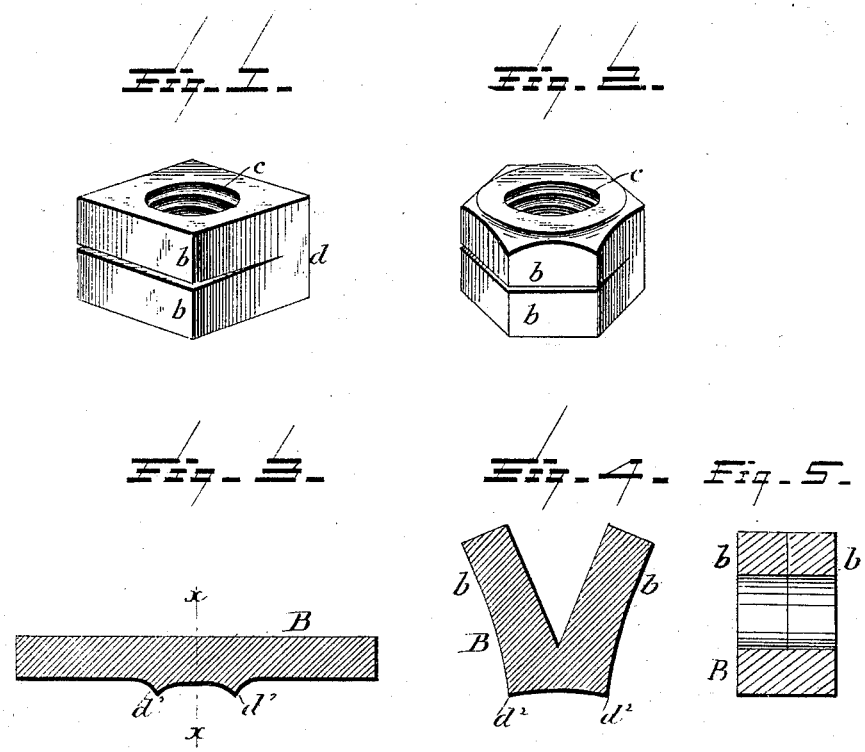
Witnesses
O. C. Schiller
J. J. Masson
Inventor
Julius C. Richardson
By his Attorney
E. E. Masson

UNITED STATES PATENT OFFICE.

JULIUS C. RICHARDSON, OF JAMESTOWN, NEW YORK.

NUT-BLANK BAR.

SPECIFICATION forming part of Letters Patent No. 461,932, dated October 27, 1891.

Application filed December 18, 1890. Serial No. 375,115. (No model.)

*To all whom it may concern:*

Be it known that I, JULIUS C. RICHARDSON, a citizen of the United States, residing at Jamestown, in the county of Chautauqua, State of New York, have invented certain new and useful Improvements in Nut-Locks, of which the following is a specification, reference being had therein to the accompanying drawings.

This invention relates to nut-locks which are provided with frictional means for engagement with the thread of bolts, and particularly to that class of nuts which have a slot formed therein made with parallel sides either by sawing partly through the body of the nut or by doubling upon itself a plate of metal made thinner at the line of the fold; and the object of my improvement is to produce with as little loss of metal as possible a nut of this class with all its sides at right angles to its top and bottom, and with a V-shaped slot therein, having its apex within the body of the nut. I attain these objects by the construction illustrated in the accompanying drawings, in which—

Figure 1 is a perspective view of a square nut constructed in accordance with my invention. Fig. 2 is a perspective view of a hexagonal nut constructed, also, in accordance with my invention. Fig. 3 is a transverse section of a bar of metal to be used to produce the nut. Fig. 4 represents a transverse section of the bar shown in Fig. 3 after it has been partly doubled upon itself on line $x\,x$ of Fig. 3. Fig. 5 is a transverse section of the nut-blank completed and punched.

The preferred manner of producing the nuts is first to roll out the iron (or other metal) in bars B, having the greater thickness in the center than at the edges, and whose cross-section is shown in Fig. 3. After one or more passes through the rolls, the bar assumes the Y-form, substantially as shown in cross-section in Fig. 4, with two branches or leaves $b$ of equal length and thickness. The Y-shaped bar is then passed between rolls to bring the two branches or leaves $b$ substantially in close contact together. The Y-shaped bar can also be obtained by splitting a rectangular bar along one of its edges one-half of its depth or more, with a blade of suitable form. The split bar obtained by either one of said means is afterward subjected to a press-punch, by which the hole $c$ is punched in the center of the width of the bar, after which it is cut into the proper shape for nut-blanks of any desired form. The split nut-blank is thus obtained at little expense with its leaves $b\,b$ in proper position relatively to each other to have the central perforation screw-tapped. After the nuts have been screw-tapped, the outer ends of the leaves $b\,b$ are forced a slight distance apart by a suitable wedge, which gives a divergent set to the leaves and a V-shaped slot in the nuts.

To permit the bar B to produce the side $d$ of the nut at right angles to its top and bottom, and give the proper form to the nut with as little waste of material as possible, said bar is preferably provided with two angular ribs $d^2$, each equidistant from the line $x\,x$, Fig. 3, on which the bar is to be bent and doubled upon itself, and thus the rectangular edges shown at $d^2$ in Fig. 4 are obtained during the manufacture of the bar, out of which the nuts are to be cut and punched.

Although it is preferred to obtain the doubled-over bars by rolling the metal, it is evident they could be obtained by forging it.

Having now fully described my invention, I claim—

A nut-blank bar B, constructed as shown and described, with the ribs $d^2$ projecting from one side thereof and adapted when said blank-bar is folded over upon itself in the manner shown to form the edge of the nut, substantially as shown and described.

In testimony whereof I affix my signature in presence of two witnesses.

JULIUS C. RICHARDSON.

Witnesses:
FRED T. POWELL,
A. JOHN PETERSON.